United States Patent Office 3,364,747
Patented Jan. 23, 1968

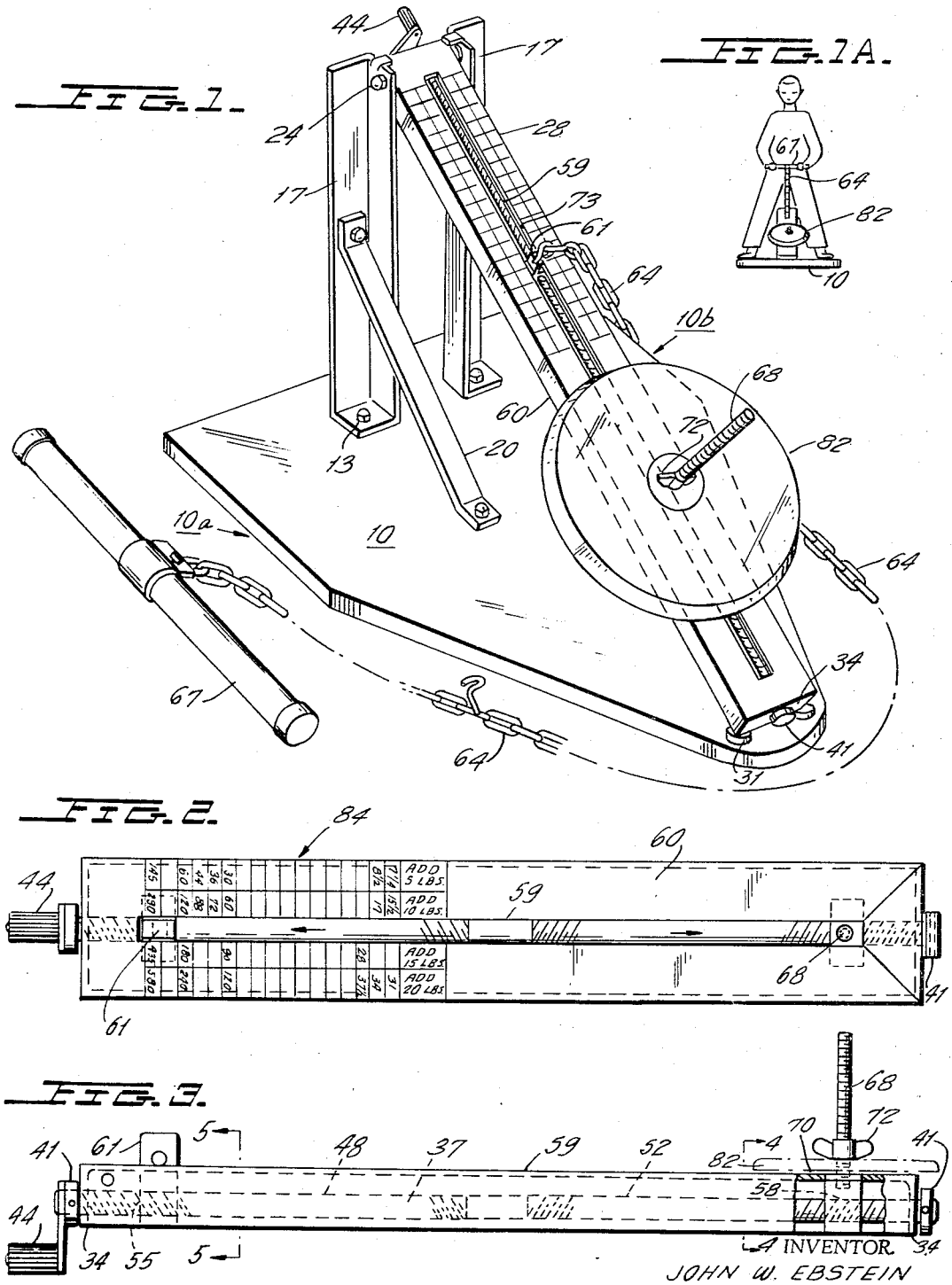

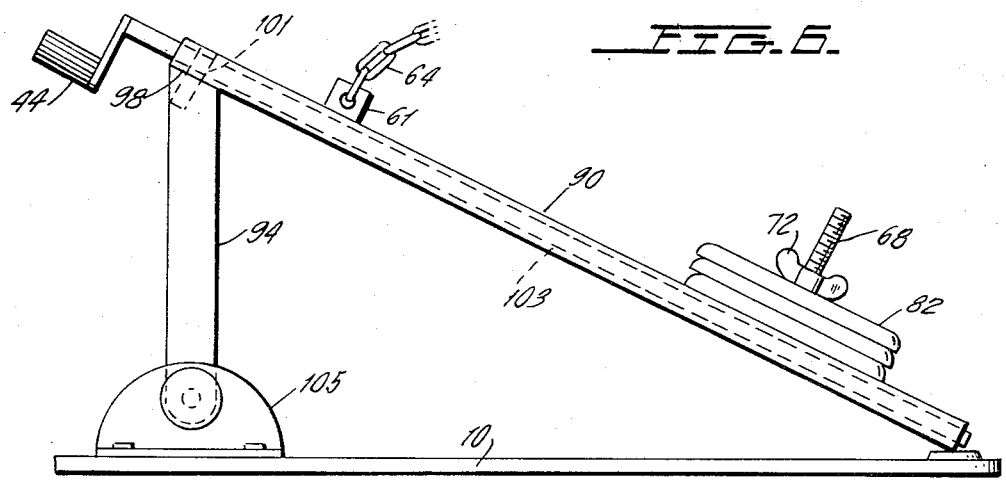
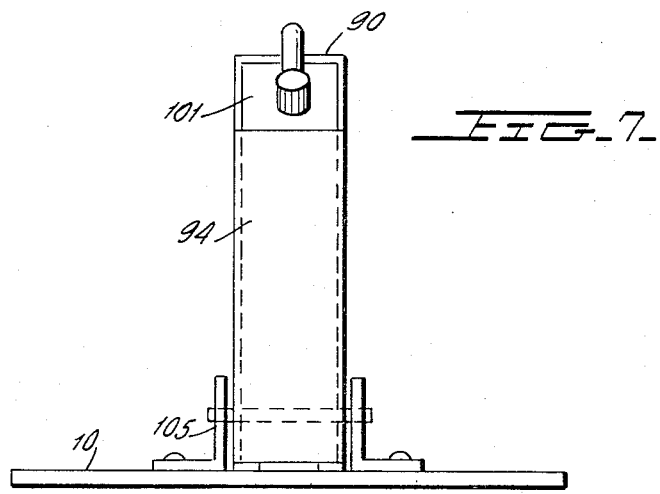
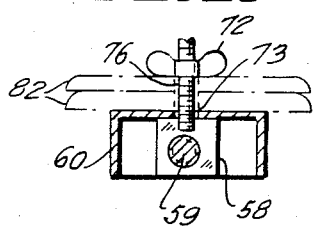
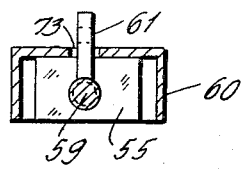

3,364,747
PIVOTALLY MOUNTED WEIGHT LIFTING EXERCISING DEVICE
John W. Ebstein, Roslyn Heights, N.Y., assignor to Gabriel Industries, Inc., New York, N.Y., a corporation of New York
Filed May 5, 1965, Ser. No. 453,324
3 Claims. (Cl. 73—379)

ABSTRACT OF THE DISCLOSURE

An exercise device consisting of a lever or bar pivoted at one end, a weight adjustably slidable toward and away from the unpivoted end, a handle connection adjustably slidable toward and away from the pivoted end (preferably by a nut and screw arrangement, where the nut extends longitudinally of the lever to vary the force required to lift the lever).

---

This invention relates to exercising devices and more particularly to devices of the type having a weight lifting function.

It is an object of the invention to provide a weight lifting device which can be used by persons of varying strengths by virtue of wide adjustability of the force necessary to operate the device, the adjustability also increasing the required operating force as an individual progressively increases his weight lifting ability in using the devices.

It is a further object of the invention to provide a simple and unique arrangement for weight adjustability in order to rapidly select any one of a wide range of predetermined weight effects in accordance with a calibrated scale.

It is still a further object of the invention to provide a construction which is simple, compact, rugged and economical to manufacture.

Other objects and features of the invention will be apparent from the description to follow.

Briefly, the invention comprises a platform which carries a beam pivotally mounted at one of its ends and which beam carries a weight adjustably slidable thereon. A handle is slidably connected by a chain to the beam intermediate the pivoted end of the beam and the weight. By adjusting the distance between the chain and the weight relative to the ends of the beam, accomplished by rotation of a single element, leverages are varied with respect to the pivoted or fulcrum end of the beam so that a predetermined lifting force can be selected for the purpose of causing the beam to swing upwardly about the pivoted end. The lower end of the chain is slidable in a slot in the beam and its position along the beam can be calibrated in accordance with a scale which effects readings for determining the amount of force in pounds required to lift the beam, depending upon the relative positions of the beam end of the chain and the weight.

A detailed description of the drawings now follows in conjunction with the drawing in which:

FIGURE 1 is a perspective of the invention;
FIGURE 1a is a view showing the stance of a person utilizing the invention for exercise;
FIGURE 2 is a plan view of the beam;
FIGURE 3 is an elevaton of the beam;
FIGURE 4 is a section through 4—4 of FIGURE 3;
FIGURE 5 is a section through 5—5 of FIGURE 3; and
FIGURES 6 and 7 are side and rear elevations, respectively, of a modified form of the invention.

Referring to the drawing, the invention comprises a platform or plate 10. FIGURE 1, which may be of wood or other suitable material, and which is adapted to rest on a floor, and having areas such as 10a and 10b of sufficient size so that a person operating the device can stand thereon.

FIGURE 1a: Suitably fastened to the base or platform 10, by bolts 13 or the like, are a pair of vertical angle iron uprights 17 braced as by members 20. At the upper ends of the uprights 17 there is pivoted therebetween, as by a pin 24, one end of an elongated member such as swinging beam 28, the other or free end of which slants downwardly to rest on a pair of cushion buttons 31 at the outer end of platform 10. The beam 28 may be bent of sheet metal so as to have end flanges such as 34 to serve as supports for a screw 37. Thus, the flanges are provided with apertures for effecting bearing support to respective ends of the screw, the screw being retained at its ends by means of set screw collars 41. At the pivoted end of the beam, a crank 44 is keyed to the screw 37.

The screw 37 has a right-hand thread section 48 and a left-hand thread section 52. A nut 55 is disposed on section 48 and a nut 58 is disposed on section 52. The nuts are in the plane of and below a longitudinal slot 59 in the beam face 60 and bear slidably on the undersurface thereof marginally of the slot, whereby the nuts are prevented from rotating and screw 37 is relieved of bending stresses. Nut 55 is fashioned with a connector tongue 61 to which the lower end of a chain 64 is secured, the upper end of the chain being connected to a handle 67. The nut 58 has a bolt 63 extending upwardly therefrom and through the slot. A wing nut 72 can clamp one or more weights of disclike configuraton such as the weight 82, on the beam, and thus lock the screw against rotation. It will be understood that two or more such weights may be held on the bolt 68 which passes through apertures at the weight centers, the direct stress of the weights being on the beam.

By loosening the wing thumb nut, rotation of crank 44 may be had and by virtue of the left and right-hand screw sections the lower end of the chain connected to nut 55 may be moved in either direction with the weight or weights moving simultaneously in the opposite direction. Thereby, the composite leverage effect is such that as the nuts approach each other less force is required to pivotally lift the beam by means of the chain and handle. By the same token, if the crank 44 is rotated to move the nuts further apart, considerably more force is required. The low reading end of the scales 84 are outwardly of the beam fulcrum.

Thus, the shifting of the point of force application of the chain and the weight are additive in the effect of providing a variation in the physical strength necessary to move the beam from the slanted position shown in FIGURE 1 to a level position or above a level position.

Ordinarily, a person using the device, standing with his feet on platform 10 would hold the bar in both hands at about or below hip length, but, of course, the chain length could be varied so that any initial position of a person's arms could be selected. For example, a hook 85 could be carried by a link to take up undesired length.

The unique effect of rotation of the crank in either direction, depending upon choice of direction, will be apparent. Thus, it is not necessary to individually shift the point of attachment for the chain and the point of force application of the weight. These points are simultaneously shifted so that their distances from the pivotal end of the beam automatically and additively coact to effect an increase or a decrease in strength necessary for raising the beam. The additive effect makes it possible to place a scale on the face of the beam which automatically indicates the force necessary for lifting the beam wherein the connector element 61 at the lower end of the chain serves as an indicator.

Thus, as seen in FIGURE 2, there are four calibrated scales on the beam face. The extreme left-hand scale being for a condition wherein five pounds are added to the beam. In a similar manner, the next three columns show the forces required for lifting the beam with a ten-pound weight, a fifteen-pound weight and a twenty-pound weight. It is contemplated that two weights of five pounds each and one ten-pound weight are furnished with the device.

Of course, a weight means comprising a plurality of weights varying in predetermined degree may be used instead of a plurality of identical weights.

FIGURES 6 and 7 show an embodiment wherein beam 90 is integral with support means 94, these members being "U" channels angularly welded at 98 where their corresponding side flanges abut. A solid metal corner piece 101 is welded across the abutting ends and serves to support the end of screw 103. The lower end of channel 94 is pivoted on brackets 105 fastened to base 108.

Having thus described the invention, it is clear that variations may be made without departing from the spirit thereof, and, accordingly, it is not sought to restrict the invention to the exact illustration herein given except as set forth in the appended claims.

I claim:
1. An exercise device comprising a beam and pivotal support means therefor at one end thereof whereby said beam has a free end, a screw means carried by said beam, said screw means consisting of a screw member, having a left hand threaded section at one end and a right hand threaded section at the other end, a nut threaded on each of said sections, a handle member connected to one such threaded nut and a weight means connected to the other threaded nut, whereby rotation of said screw member effects simultaneous movement in opposite directions of said nuts to simultaneously vary the point of connection of said handle member and the position of said weight means to additively increase or decrease the strength required to lift said beam by means of said handle member.

2. An exercise device as set forth in claim 1, said beam having a longitudinal slot, said screw member being disposed in the plane of said slot, said nuts having support marginally on each side of said slot.

3. An exercise device as set forth in claim 1, said weight means being selectively variable in predetermined amounts, a slot in said beam, said screw extending in said slot, and a plurality of calibrated scales extending alongside said slot wherein said scales correspond to the value of weight means carried by said beam, and means for attaching said handle to its respective nut comprising an element extending upwardly through said slot and carried by said respective nut and serving as an indicator with respect to said scales.

References Cited

UNITED STATES PATENTS

| | | | |
|---|---|---|---|
| 327,918 | 10/1885 | Brotherhood | 272—67 |
| 2,783,045 | 2/1957 | Bosch | 272—81 |

ANTON O. OECHSLE, *Primary Examiner.*

F. BARRY SHAY, *Examiner.*

W. R. BROWNE, *Assistant Examiner.*